United States Patent
Yang

(10) Patent No.: US 10,350,719 B2
(45) Date of Patent: Jul. 16, 2019

(54) DEVICE FOR DISCHARGING CHIPS

(71) Applicant: SAMHEUNG PRECISION. CO. LTD., Changwon (KR)

(72) Inventor: Jae Yeol Yang, Changwon (KR)

(73) Assignee: SAMHEUNG PRECISION CO. LTD., Changwon (KR)

( * ) Notice: Subject to any disclaimer, the term of this patent is extended or adjusted under 35 U.S.C. 154(b) by 0 days.

(21) Appl. No.: 15/570,704

(22) PCT Filed: Apr. 26, 2016

(86) PCT No.: PCT/KR2016/004331
§ 371 (c)(1),
(2) Date: Oct. 30, 2017

(87) PCT Pub. No.: WO2016/195246
PCT Pub. Date: Dec. 8, 2016

(65) Prior Publication Data
US 2018/0290252 A1      Oct. 11, 2018

(30) Foreign Application Priority Data

Jun. 2, 2015  (KR) .................. 20-2015-0003533 U
Dec. 18, 2015 (KR) .................. 20-2015-0008340 U

(51) Int. Cl.
| | |
|---|---|
| B23Q 11/00 | (2006.01) |
| B65G 17/02 | (2006.01) |
| B65G 17/06 | (2006.01) |
| B65G 17/30 | (2006.01) |
| B65G 45/00 | (2006.01) |
| B65G 19/02 | (2006.01) |

(52) U.S. Cl.
CPC ...... *B23Q 11/0075* (2013.01); *B23Q 11/0057* (2013.01); *B65G 17/02* (2013.01); *B65G 17/06* (2013.01); *B65G 17/065* (2013.01); *B65G 17/30* (2013.01); *B65G 45/00* (2013.01); *B65G 19/025* (2013.01); *B65G 2201/02* (2013.01)

(58) Field of Classification Search
CPC ............ B23Q 11/0057; B23Q 11/1069; B65G 17/067; B65G 17/065
See application file for complete search history.

(56) References Cited

U.S. PATENT DOCUMENTS

| | | | | |
|---|---|---|---|---|
| 2,810,467 | A * | 10/1957 | Bogaty | A24B 3/00 131/290 |
| 3,690,445 | A * | 9/1972 | Ouska | B65G 17/067 198/822 |
| 3,756,382 | A * | 9/1973 | Adey, Jr. | B65G 15/42 198/690.2 |
| 4,932,515 | A * | 6/1990 | Stohr | B65G 17/067 198/822 |
| 5,375,721 | A * | 12/1994 | LaVigne | B03B 4/04 209/131 |
| 5,992,642 | A * | 11/1999 | Ota | B01D 33/04 210/394 |
| 6,511,597 | B2 * | 1/2003 | Hori | B23Q 11/0057 210/298 |

(Continued)

*Primary Examiner* — William R Harp

(57) ABSTRACT

Provided is a device discharging chips, which is configured to allow smooth transfer because it is possible to absorb transformation of connecting pins due to a force generated while chain driven belts are operating as well as smoothly discharging a coolant and chips.

8 Claims, 2 Drawing Sheets

(56) References Cited

U.S. PATENT DOCUMENTS

| | | | |
|---|---|---|---|
| 8,048,302 B2 * | 11/2011 | Corsaro | B01D 33/073 210/297 |
| 9,415,475 B2 * | 8/2016 | Tak | B23Q 11/0057 |
| 10,105,806 B2 * | 10/2018 | Suzuki | B23Q 11/0057 |

* cited by examiner

DEVICE FOR DISCHARGING CHIPS

This application is a U.S. National Stage of PCT/KR2016/004331, filed Apr. 26, 2016, which claims the priority benefit of Korean Patent Application Nos. 20-2015-0003533, 20-2015-0008340 filed on Jun. 2, 2015 and Dec. 18, 2015 in the Korean Intellectual Property Office, the disclosures of which are incorporated herein by reference.

TECHNICAL FIELD

The present disclosure relates to a device for discharging chips which are generated during a cutting process of a machine tool and more particularly, to a chip discharging device configured to permit a smooth transfer, by absorbing transformation of a connecting pin due to a force generating while a chain driven belt is operating, while smoothly discharging a coolant and chips.

BACKGROUND ART

A processing machine usually performs a cutting process accompanying generation of chips while processing a workpiece. Those chips are practically generated due to the cutting process of a workpiece and a coolant supplied for lubrication and heat prevention between the workpiece and a bite goes to flow downward from a cut part along with the chips.

As a related art of such a chip discharging device for a processing machine, there is Korean Patent Publication No. 10-2013-0128174. Such an antecedent related art does not disclose a detailed structure for efficiently discharging a coolant and chips, but only a configuration for discharging chips. Even by the related art, there could not be found a disclosure dealing with a problem for an abnormal operation of a chain driven belt, which may occur in the case of transformation of connecting pins due to an external force.

DETAILED DESCRIPTION OF THE INVENTION

Technical Problem

The present disclosure is directed to provide a device for discharging chips, capable of discharging a coolant, which is used in a cutting process, and chips generated from the cutting process, by efficiently separating all of the coolant and the chips.

The present disclosure is also directed to provide a device for discharging chips, capable of more smoothly operating by absorbing transformation of connecting pins of a chain driven belt due to an external force that may occur by microscopic chips.

The present disclosure is also directed to a device for discharging chips, having a shape more helpful for discharging chips.

Technical Solution

To achieve the aforementioned directions of the present disclosure, a device for discharging chips includes a multiplicity of belt segments connected to allow jointed movement in a transfer direction, a multiplicity of chain belt guides installed respectively at outsides of the belt segments and having a specific height, a chain part installed at outsides of the belt guides, coupled with a sprocket operating by an external power source, and rotating the device for discharging chips, a multiplicity of chip supporting plates fixed on the belt segments, having bottom parts at which coolant discharging grooves are molded to discharge a coolant, and having a shape where peaks and valleys are repeated on a top view, and belt segment connecting pins connecting the multiplicity of belt segments, belt guides, and the chain part to allow jointed movement in a width direction. Here, top end parts of the chip supporting plates have tooth shapes where peak parts and valley parts continue.

According to another embodiment of the present disclosure, the belt guide includes a pair of through holes formed with a specific interval at a bottom part and into which the belt segment connecting pin is inserted, wherein one of the pair of the through holes has a long-hole shape having an interval in which the connecting pin inserted to the transfer direction is movable within a specific range. The shape of the through hole prevents transformation such as transformation such as buckling of the connecting pin.

Advantageous Effects of the Invention

According to the present disclosure with the aforementioned configuration, it is possible to concentrate chips into a valley part of a chip supporting plate and to discharge them outside, as smoothly discharging a coolant through a coolant discharging groove formed at the bottom of the chip supporting plate. Therefore, it can be seen that the device for discharging chips is able to effectively discharge the chips as well as the coolant.

Additionally, according to the present disclosure, it can be seen that connecting pins are inserted with an interval into one of a pair of through holes formed at a guide. The through hole shaped in a long hole allows the connecting pin, which is inserted into the inside, to move in a specific range, being expected to substantially minimize transformation or damage of the connecting pin.

Additionally, according to the present disclosure, a chip supporting plate, which has a top end shaped in a tooth where peaks and valleys are repeated, is expected to easily draw and discharge tangled chips, resulting in effectively discharging very disorderly discharged chips.

DESCRIPTION OF THE DRAWINGS

FIG. 1A is a top view; FIG. 1B is a side view; and FIG. 1C is a front view.

BEST MODE

Figure 1:
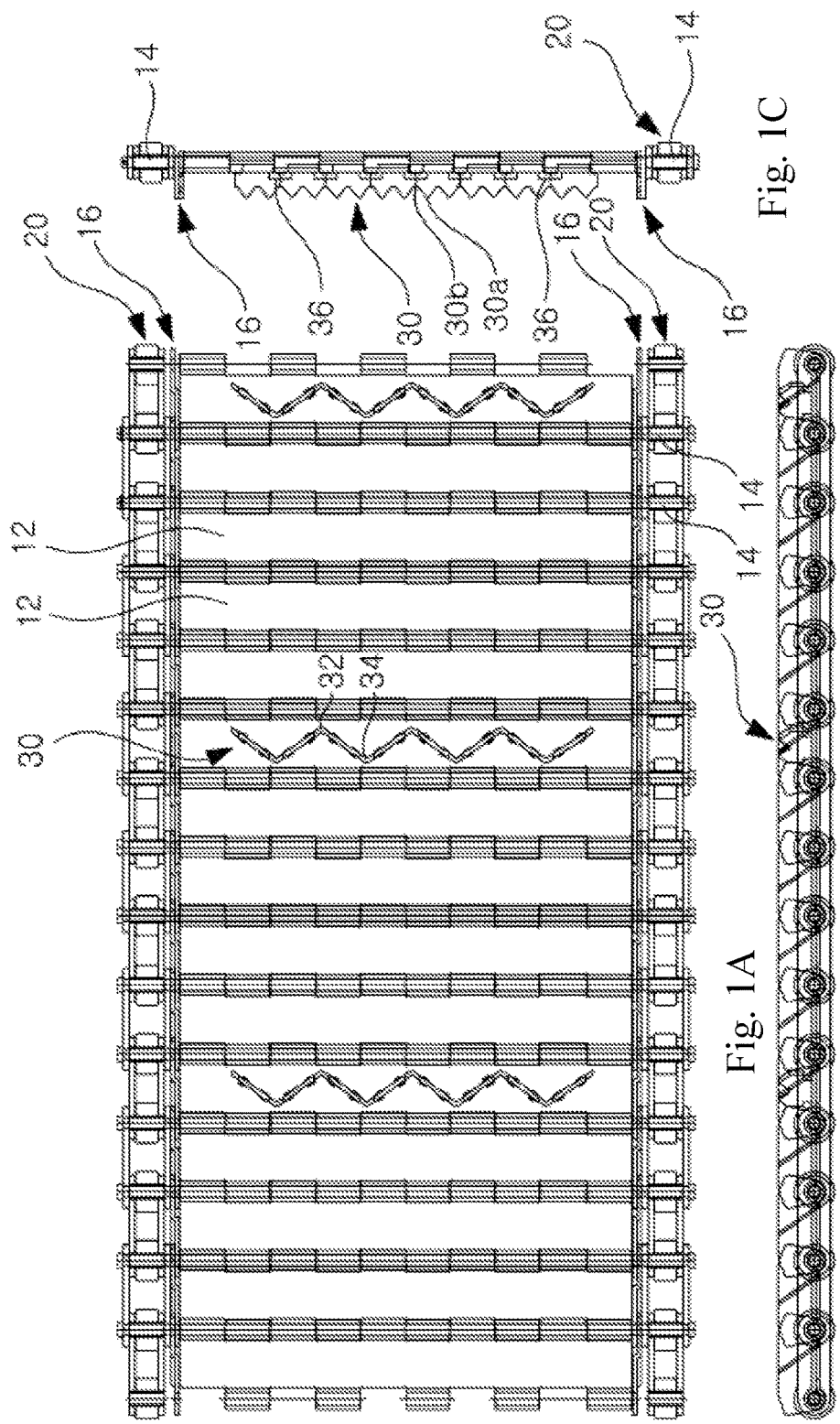
FIGS. 1A to 1C illustrate a device for discharging chips in accordance with the present disclosure.

Hereafter, a device for discharging chips (hereafter referred to as 'chip discharging device') according to the present disclosure will be described based on embodiments shown in the drawings. First, as shown in FIGS. 1A to 1C and FIG. 2, a chip discharging device includes a multiplicity of belt segments 12 receiving chips, which are generated from a cutting process, and a coolant which is used in the cutting process. The multiplicity of belt segments 12 are connected through a multiplicity of joints with a specific length along a transfer direction. The connection among the belt segments 12 made of metal plates is rotatably configured by connecting pins 14.

The multiplicity of belt segments 12 is molded to form an interlinked belt as shown in FIG. 1C. Rotating the belt segments 12 is performed by a sprocket which conveys rotation to the discharging device from a power source. The sprocket is caught in chain parts 20, which are installed at both sides of the belt segments 12, to drive the chip discharging device.

The chain parts 20, for rotating the chip discharging device in the condition that they is coupled with the sprocket, may be substantially formed in the same function and structure with a chain of a bicycle. Since the chain parts 20 themselves are formed in a widely used configuration at present, detailed descriptions thereabout will not be further provided hereafter.

Between the chain parts 20 and the belt segments 12, belt guides 16 are interposed. The connecting pins 14 are installed to connect components of the chain parts 20 and the belt guides 16, as well as connecting the successive belt segments 12 themselves to be rotatable. In other words, the connecting pins 14 are installed to connect all of the chain parts 20, which are set on the outermost side, the guides 16 set in the inside, and the belt segments 12 set at the center.

According to the present disclosure, in the top view as shown in FIG. 1A, a chip supporting plate of a V-shape (a shape where peaks and valleys are successively repeated) successive along a width direction is fixed on the belt segments 12. The chip supporting plate 30 may be fixed on the belt segments 12 by, for example, a welding. By rotation of the chip discharging device according to the present disclosure, chips are concentrated in valley parts 34 by the boundaries as peak parts 32 of the chip supporting plate 30. As clearly shown in FIGS. 1B and 2, coolant discharging grooves 36 are molded at the bottom surface of the chip supporting plate 30.

As shown in FIG. 1C, the chip supporting plate 30 has a tooth-shaped top end part where peaks 30a and valleys 30b are successively arranged. As such, molding the top end part of the chip supporting plate 30 into a tooth shape is planned in consideration of irregular patterns of chips which are discharged. For example, chips generating during a process of a workpiece are usually discharged in a tangled state with vey irregular patterns.

As such, it is expected that chips irregularly discharged in a tangled state may be caught more easily in the tooth shape of the chip supporting plate 30. Accordingly, as embodied as the present disclosure, by providing the tooth shape, where peaks and valleys are repeated, to the top end part of the chip supporting plate 30, tangled chips may be more easily discharged through the peak parts 30a.

It is preferred for a chip discharging device according to the present disclosure to be installed to have a lower left part on FIG. 1A. Accordingly, if the chip discharging device of the present disclosure rotates in the transfer direction, a coolant and chips dropping onto the top parts of the belt segments 12 move to opposite directions from each other. In other words, a coolant dropped to the top parts of the belt segments 12 flows downward through the coolant discharging grooves 36, while chips are caught in the chip supporting plate 30 and move along the same direction with the belt segments 12.

During this, a coolant flowing downward through the coolant discharging grooves 36 may collected into an additional reserving tank and chips may be concentrated on the valley parts 34 in the chip supporting plate 30. Concentration of chips which are generated during a cutting process substantially means a lumping or tangling among them, and this result means that the discharge of chips to the outside becomes more effective entirely. Moreover, in the case that chips are irregularly discharged and tangled, the chips may even move together while being caught in the peak parts 30a before they are concentrated in the valley parts.

Then, a coupling structure between the connecting pins 13 and the belt guides 16 will be described hereafter. The chain belt guides 16 are installed with a specific height between the belt segments 12 and the chain parts 20 to prevent chips, which are dropping to the top of the belt segments 12, from passing out to the outside. Since front and rear parts of the guides 16 have specific steps, the guides 16 are formed, as generally, to be connected in a specific width even though they are connected each other in multiplicity.

The aforementioned connecting pins 14, as jointedly connecting neighbors of the belt segments 12, also rotatably connect the belt guides 16 through elongated parts to both sides, and further rotatably connect the chain parts 20. This configuration such that the connecting pins 14 themselves rotatably support the belt segments 12, the belt guides 16, and the chain parts 20, together, may be regarded as a substantially known art.

Figure 2:
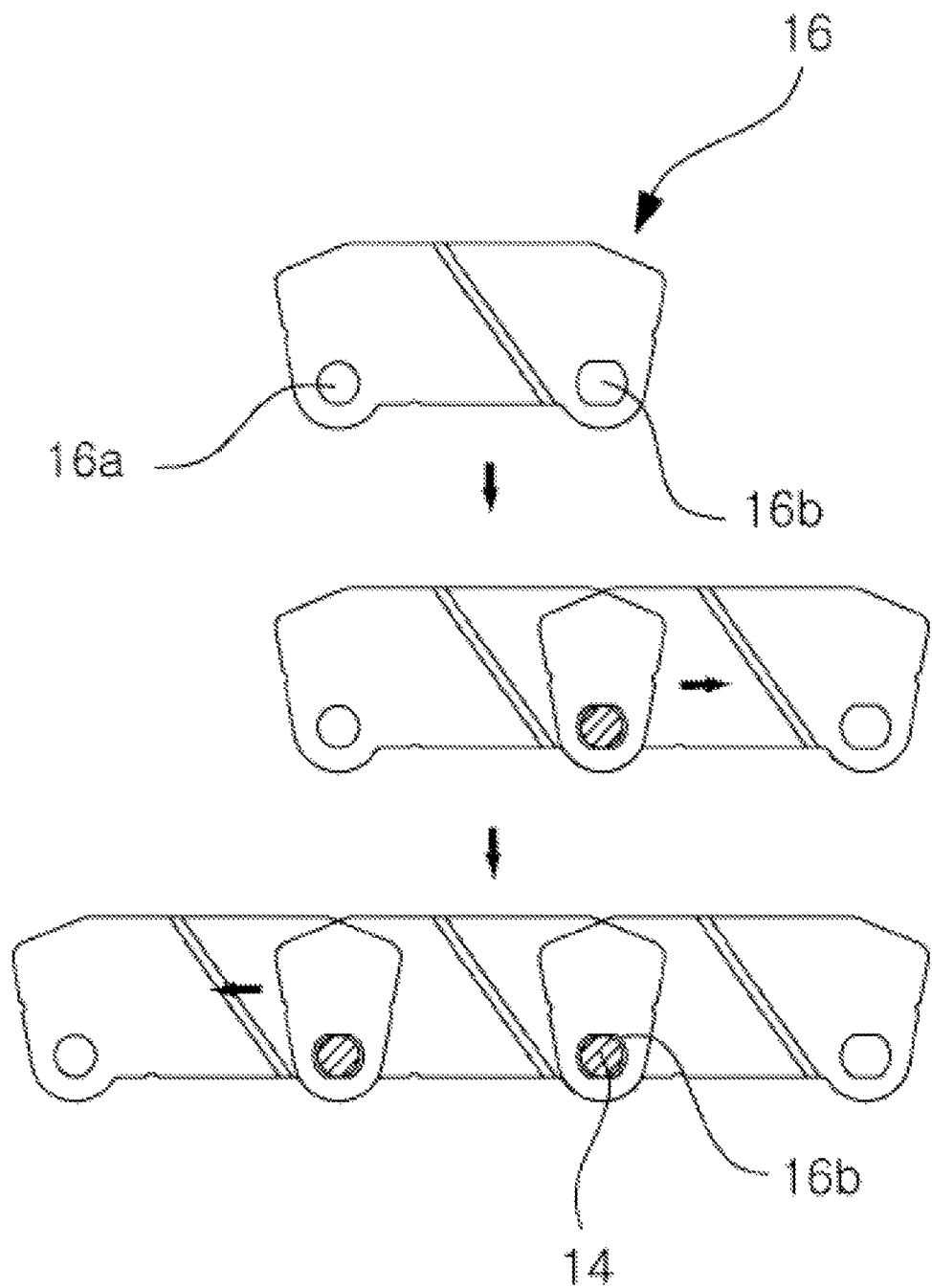
FIG. 2 is an exemplary view of a belt guide according to the present disclosure.

As shown in FIG. 2, the belt guides 16 are plate-type members with specific heights and through holes 16a and 16b are molded respectively at the front and rear sides of the bottom end part. The through holes 16a and 16b are parts through which the connecting pins 14 pass. By the connecting pins 14 passing the through holes 16a and 16b, the belt guides 16 may be supported to rotate (jointed movement) with their neighbors.

According to the present disclosure, it can be seen that the first through holes 16a of the belt guides 16 are molded in a round shape as same as the connecting pins 14, and the second through holes 16b are molded in a long-hole shape having a specific interval (space) along the transfer direction. If the connecting pins 14 are inserted into the second through holes 16b, it is natural that specific margins are provided in the left and right directions (transfer direction) of the connecting pins 14. As such, the specific margin (interval) to the transfer direction in the state that the connecting pins 14 are inserted means that the connecting pins 14 may substantially move to the transfer direction in a specific range.

If the chip discharging device including the belt segments 12 of the present disclosure is driven, the belt segments 12 move respectively in a continuous loop while jointedly moving in a specific range. When this movement continues, chips and a coolant drop to the top surface of the belt segments 12 as described above and they are discharged to the outside. During this, a case that an external force is applied to the belt segments 12 may occur as like penetration of microscopic chips between the belt segments 12.

As such, if an external force is applied to the belt segments 12 or the connecting pins 14 connecting the belt segments 12, the external force finally acts on the connecting pins 14. The connecting pins 14 receive stress as transformed (e.g., buckling) by such an external force. According to the present disclosure, since the connecting pin 14 has a specific interval in the inside of one of the through holes 16b, it is able to move back and forth along the transfer direction as much as the specific interval.

As such, the moving capability of the connecting pin 14 in the inside of the second through hole 16b means that a problem such as transformation by an external force does not occur. In other words, since an end part of a side of the connecting pin 14 is able to move in a range of the second through hole 16b even though an external force is applied to the connecting pin 14 in a specific range, it is possible to prevent the connecting pin 14 from transformation or damage.

As described above, according to the present disclosure, it can be seen that the chip supporting plate 30, in where coolant discharging grooves are molded on the bottom surface thereof, is installed in multiplicity as multiplicities of peaks and valleys are repeated on the top parts of the belt segments 12. And, it can be seen that the connecting pins 14 respectively connecting the respective belt segments 12, the guides 16, and the chain parts 20 in a width direction are formed in the respective insides of the through holes 16b.

While the present disclosure has been shown and described with reference to various embodiments thereof, it will be understood by those skilled in the art that various changes in form and details may be made therein without departing from the spirit and scope of the present disclosure as defined by the appended claims and their equivalents.

INDUSTRIAL APPLICABILITY

Since a coolant and chips generating a cutting process of a processing machine can be smoothly discharged, the present disclosure may be the technology capable of achieving useful and economical values by widely employing the device according to the present disclosure in an industrial art of processing machines.

The invention claimed is:

1. A device for discharging chips, comprising:
a plurality of interlinked belt segments coupled together to form a segmented belt;
a plurality of chain links that are coupled together to form chains at opposing ends of the belt segments;
a plurality of belt guides disposed between the chain links and the belt segments at opposing ends of the belt segments and having a height greater than a height of the chain links;
a plurality of chip supporting plates disposed on respective belt segments; and
a plurality of connecting pins that run through holes in the chain links, the belt guides and the belt segments and provide jointed movement of the belt segments in a width direction to discharge the chips,
wherein each chip supporting plate comprises:
at least one coolant discharging groove disposed at a base portion;
an upper surface facing away from the belt segments, the upper surface having a tooth-shaped profile including a series of peaks and valleys; and
a jagged body shape oriented in the width direction comprising a series of peaks and valleys.

2. The device of claim 1, wherein each chain guide includes a pair of through holes formed with a specific interval at a bottom part and into which the connecting pin is inserted, wherein one of the pair of the through holes has a long-hole shape having an interval in which the connecting pin inserted to the transfer direction is movable within a specific range.

3. The device of claim 1, wherein the at least one coolant discharging groove includes a plurality of coolant discharging grooves disposed at valleys of the jagged body.

4. The device of claim 1, wherein the at least one coolant discharging groove includes a plurality of coolant discharging grooves disposed at peaks and valleys of the jagged body.

5. The device of claim 1, wherein the chip supporting plates span a majority of a width of the belt segments.

6. The device of claim 1, wherein a number of the peaks and valleys of the upper surface of the chip supporting plates is greater than a number of the peaks and valleys of the jagged profile.

7. The device of claim 1, wherein at least two belt segments without any chip supporting plates are disposed between each belt segment on which a chip supporting plate is disposed.

8. The device of claim 1, wherein the peaks and valleys of the jagged body shape are defined by a series of linear segments, and each peak is connected to each valley through a single linear segment.

* * * * *